(12) United States Patent
Karlsson

(10) Patent No.: US 10,891,640 B2
(45) Date of Patent: Jan. 12, 2021

(54) ADAPTIVE REPRESENTATION OF A PRICE/VOLUME RELATIONSHIP

(71) Applicant: OATH (AMERICAS) INC., Dulles, VA (US)

(72) Inventor: Niklas Karlsson, Mountain View, CA (US)

(73) Assignee: Verizon Media Inc., New York, NY (US)

( * ) Notice: Subject to any disclaimer, the term of this patent is extended or adjusted under 35 U.S.C. 154(b) by 1204 days.

(21) Appl. No.: 15/055,369

(22) Filed: Feb. 26, 2016

(65) Prior Publication Data
US 2017/0249652 A1 Aug. 31, 2017

(51) Int. Cl.
*G06Q 30/00* (2012.01)
*G06Q 30/02* (2012.01)

(52) U.S. Cl.
CPC ..... *G06Q 30/0206* (2013.01); *G06Q 30/0251* (2013.01); *G06Q 30/0277* (2013.01); *G06Q 30/0283* (2013.01)

(58) Field of Classification Search
CPC .................................................. G06Q 30/0206
USPC ....................................................... 705/7.35
See application file for complete search history.

(56) References Cited

U.S. PATENT DOCUMENTS

| | | | | |
|---|---|---|---|---|
| 8,332,268 B2* | 12/2012 | Carruthers | ............. | G06Q 30/02 705/14.52 |
| 9,715,699 B1* | 7/2017 | Els | ..................... | G06Q 30/0275 |
| 9,747,618 B1* | 8/2017 | Reiss | ................. | G06Q 30/0275 |
| 10,068,247 B2* | 9/2018 | Xu | ..................... | G06Q 30/0244 |
| 10,282,758 B1* | 5/2019 | Els | ..................... | G06Q 30/0244 |
| 2010/0262455 A1* | 10/2010 | Karlsson | ............ | G06Q 30/0275 705/14.45 |
| 2010/0262497 A1* | 10/2010 | Karlsson | ................ | G06Q 30/02 705/14.71 |
| 2012/0323674 A1* | 12/2012 | Simmons | ............... | G06Q 30/02 705/14.41 |

* cited by examiner

*Primary Examiner* — Gautam Ubale
*Assistant Examiner* — Michael I Ezewoko
(74) *Attorney, Agent, or Firm* — Cooper Legal Group, LLC

(57) ABSTRACT

Embodiments of the present invention provide systems, methods, and computer storage media directed at adaptive representation of a price/volume relationship. In embodiments, a method may include receiving, from a campaign control system, a request for price/volume information. The request may include an identifier of an audience which is targeted by the campaign control system. The method may continue by generating a representation of a price/volume curve based on previously collected price/volume data for the target audience. In some embodiments, adjacent prices included within the representation are determined based on a change in volume between the adjacent prices. The representation can then be output to the campaign control system to enable the campaign control system to determine an initial bid calculated to achieve a desired pacing based on the representation. Other embodiments may be described and/or claimed herein.

20 Claims, 9 Drawing Sheets

```
function [priceSet, volumeSet] = fAdaptivePVcurveSimulator    ← 402

% Configuration parameters
    priceLow = 0;            ← 406
    priceHigh = 20;          ← 408
    minDeltaPrice = 0.01;    ← 410
    maxRelDeltaVolume = 0.05;← 412
    minDeltaVolume = 100;    ← 414

% Start of adpative p/v vector generation
    priceSet = [priceLow];                   ← 420
    volumeSet = [fVolume(priceLow)];         ← 422
    [priceSet, volumeSet] = fAdaptivePVvectorGenerator(priceSet, volumeSet, priceLow,priceHigh,minDeltaPrice,maxRelDeltaVolume,  ← 424
        minDeltaVolume);     ← 426
    priceSet = [priceSet, priceHigh];
    volumeSet = [volumeSet, fVolume(priceHigh)];    ← 428 end
```

Fig. 4

```
500
  function [priceSet, volumeSet] = fAdaptivePVvectorGenerator(priceSet, volumeSet, priceLow, priceHigh, minDeltaPrice, maxRelDeltaVolume, 502
                                                              minDeltaVolume)

504 {
    volumeLow = fVolume(priceLow);                            506
    volumeHigh = fVolume(priceHigh);                          508
    deltaVolume = volumeHigh-volumeLow;                       510
    deltaPrice = priceHigh-priceLow;                          512

514 { if (volumeLow==0 && deltaPrice>minDeltaPrice && deltaVolume>minDeltaVolume)   518  ||  520
       (deltaVolume/(volumeLow+1)>maxRelDeltaVolume && deltaPrice>minDeltaPrice && deltaVolume>minDeltaVolume)  522

516 {   priceMidPoint = (priceLow+priceHigh)/2;                524
       volumeMidPoint = fVolume(priceMidPoint);               526
       [priceSet, volumeSet] = fAdaptivePVvectorGenerator(priceSet, volumeSet, priceLow, priceMidPoint, minDeltaPrice, maxRelDeltaVolume);   528
       priceSet = [priceSet, priceMidPoint];                  530  532
       volumeSet = [volumeSet, volumeMidPoint];               534
                                                              536
       [priceSet, volumeSet] = fAdaptivePVvectorGenerator(priceSet, volumeSet, priceMidPoint, priceHigh, minDeltaPrice, maxRelDeltaVolume);  538
                                                              540  542
    end   544
    end   546
```

Fig. 5

ADAPTIVE REPRESENTATION OF A PRICE/VOLUME RELATIONSHIP

TECHNICAL FIELD

The present disclosure relates generally to computing. More specifically, and without limitation, the present disclosure relates to systems and methods for adaptive representation of a price/volume relationship.

BACKGROUND

Online marketers are interested in placing marketing messages on websites to promote their products or services (also known as "impressions"). Influenced by a marketing message, a user may perform a "click" based on a marketing message or take another "action" such as completing an online form to request additional information with regard to the associated product or service. If the user later purchases the product or service, the purchase is referred to as a "conversion" of the impression. In general, online marketers pay based on, for example, impressions, clicks, views, or conversions over the course of a marketing campaign, hereinafter merely referred to as a "campaign," in an effort to achieve a desired revenue for the campaign. In a campaign, revenue generally refers to the amount of money actually spent or the number of events delivered. As a result, estimating a relationship between a price and a number of events that can be delivered at that price is important to properly manage the campaign, e.g., to try and achieve desired revenue.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

BRIEF DESCRIPTION OF THE DRAWINGS

FIG. 4 depicts illustrative pseudo code that can be utilized for producing a vector representation of a price/volume (P/V) curve, in accordance with various embodiments of the present disclosure.

FIG. 5 depicts pseudo code for an illustrative function that can produce a representation of a P/V curve, hereinafter function 500 for ease of reference.

DETAILED DESCRIPTION OF THE EMBODIMENTS

Reference will now be made in detail to illustrative embodiments of the invention, examples of which are illustrated in the accompanying drawings. Wherever possible, the same reference numbers will be used throughout the drawings to refer to the same or like parts.

Figure 1:
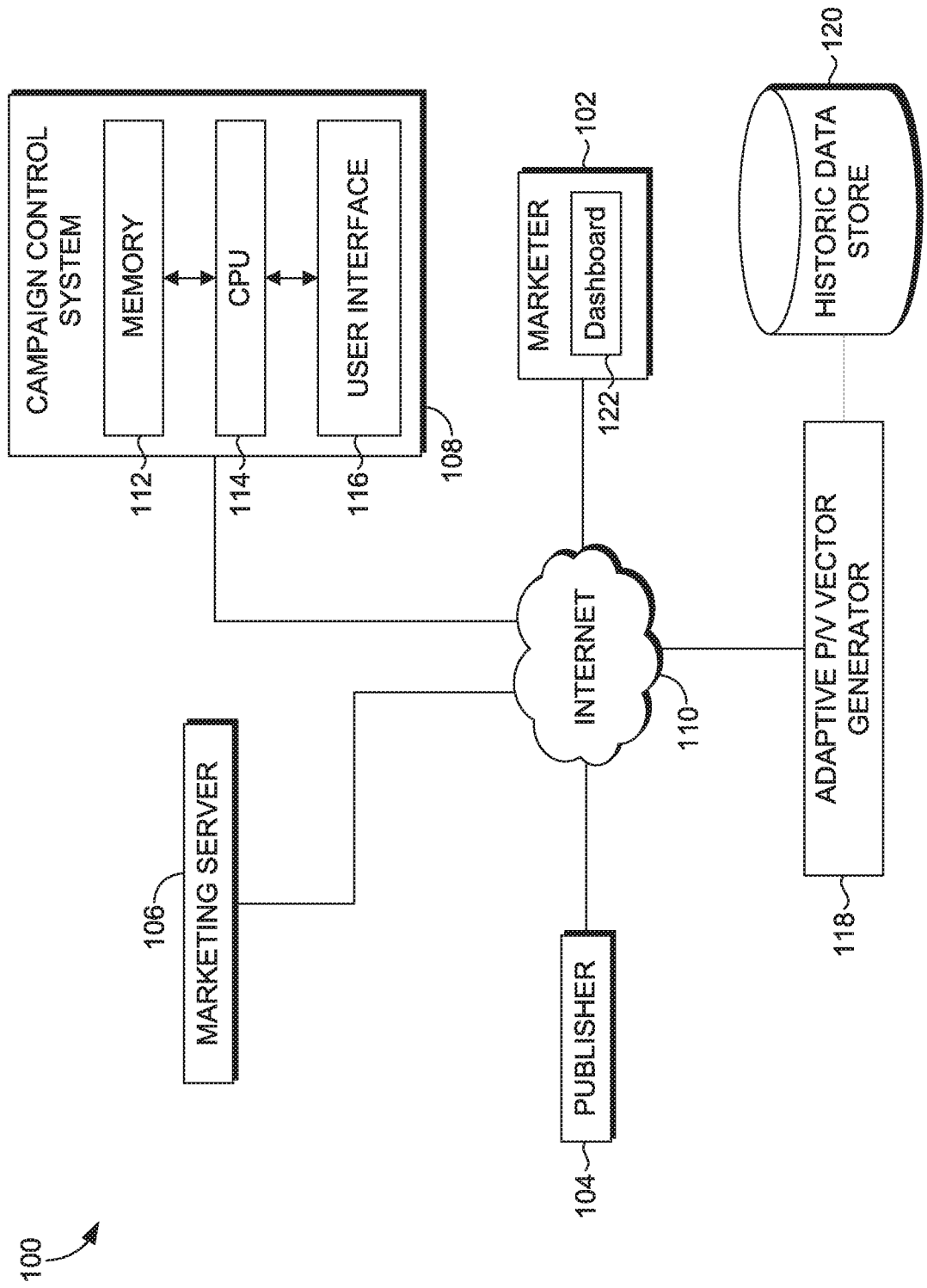
FIG. 1 depicts an illustrative marketing system, in accordance with embodiments of the present disclosure.

FIG. 1 depicts an illustrative marketing system 100, in accordance with embodiments of the present disclosure. As shown in FIG. 1, marketing system 100 may include one or more marketers 102, publishers 104, marketing servers 106, campaign control systems 108, adaptive price/volume (P/V) vector generators 118 that are in communication with one another through a network, such as the Internet 110. The number and orientation of the computing components in FIG. 1 is provided for purposes of illustration only. Any other number and orientation of components is possible. For example, one or more marketers 102, publishers 104, marketing servers 106, campaign control systems 108, adaptive P/V vector generators 118, and historic data stores 120 may be combined or co-located and/or communicate directly with one another, instead of over Internet 110. The components of FIG. 1 may include any type or configuration of computers and/or servers, such as, for example, a server cluster, a server farm, load balancing servers, distributed servers, etc. In addition, each component may include one or more processors, memories or other data storage devices (i.e., computer-readable storage media), such as hard drives, NOR or NAND flash memory devices, or Read Only Memory (ROM) devices, etc., communications devices, and/or other types of computing elements.

Marketer 102 represent computing components associated with entities having online advertisements (e.g., banner ads, pop-ups, etc.) that the entities desire to deliver to online consumers. Marketer 102 may interact with publishers 104, marketing servers 106, campaign control systems 108, and/or adaptive price versus volume (P/V) vector generator 118 through the Internet 110. Thus, marketer 102 may be able to communicate marketing information, such as ad information, targeting information, consumer information, budget information, bidding information, etc., to other entities in marketing system 100. Dashboard 122 can be configured to present information concerning marketing system 100 and, in particular, existing or potential marketing campaigns and associated target audiences. This information can include, for example, P/V information discussed herein. In embodiments, this P/V information can include a vector representation of a P/V curve for a target audience of a campaign to aid a user of dashboard 122 in determining aspects of an online marketing campaign that includes the target audience. Such a vector representation of a P/V can be generated, for example, by adaptive P/V vector generator 118 based on P/V information contained in historic data store 120.

Publishers 104 represent computing components associated with entities having inventories of available online marketing space. For example, publishers 104 may include computing components associated with online content providers, search engines, e-mail programs, web-based applications, or any computing component or program having online user traffic. Publishers 104 may interact with marketers 102, marketing servers 106, and/or controllers 108 via the Internet 110. Thus, publishers 104 may be able to communicate inventory information, such as site information, demographic information, cost information, etc., to other computing components in system 100.

Marketing servers 106 may include servers or clusters of servers configured to process marketing information from marketer 102 and/or inventory information from publishers 104, either directly or indirectly. In certain embodiments, marketing servers 106 may be remote web servers that receive marketing information from marketer 102 and serve ads to be placed by publishers 104. Marketing servers 106 may be configured to serve ads across various domains of publishers 104, for example, based on marketing information provided by marketers 102. Marketing servers 106 may also be configured to serve ads based on contextual targeting of web sites, search results, and/or user profile information, all of which can be utilized in determining a target audience. In some embodiments, marketing servers 106 may be configured to serve ads based on control signals generated by campaign control systems 108.

Historic data store 120 can include historic information concerning each impression that is delivered within marketing system 100, including a price of each impression (e.g., clearing price), additional events that the impression lead to (e.g., click-through, conversion, viewed, etc.), and audience information for the impression (e.g., website, location information, demographic information, etc.).

Adaptive P/V vector generator 118 can utilize the historic information discussed above to generate a vector representation of a price volume curve of a target event for a target audience. Such a vector representation can include a sequence of prices and a corresponding sequence of event volumes of the target event. In embodiments, the prices included within the sequence of prices can be determined such that adjacent prices included within the vector representation are determined based, at least in part, on a difference in volume of the target event between the adjacent prices. The generation of such a vector representation is discussed in greater detail below.

Campaign control system 108 may include computing systems configured to receive information from computing components in system 100, process the information, and generate marketing control signals to be sent to other computing components in system 100, according to the illustrative methods described herein. As discussed in greater detail below, operations performed by campaign control system 108 can, for example, be initialized, re-initialized, or guided utilizing a representation of a P/V curve (e.g., that produced by adaptive P/V vector generator 118). Campaign control systems 108 may include any type or combination of computing systems, such as clustered computing machines and/or servers, including virtual computing machines and/or virtual servers. Campaign control systems 108 may include, for example, implementations of Adlearn Open Platforms (AOP) control systems offered by America Online (AOL) of New York, N.Y. In some embodiments, campaign control systems 108 may include an assembly of hardware, including a memory 112, a central processing unit ("CPU") 114, and/or a user interface 116. Memory 112 may include any type of RAM or ROM embodied in a physical, computer-readable storage medium, such as magnetic storage including floppy disk, hard disk, or magnetic tape; semiconductor storage such as solid state disk (SSD) or flash memory; optical disc storage; or magneto-optical disc storage. CPU 114 may include one or more processors for processing data according to instructions stored in the memory, for example to perform the methods and processes discussed in detail herein. The functions of the processor may be provided by a single dedicated processor or by a plurality of processors. Moreover, the processor may include, without limitation, digital signal processor (DSP) hardware, or any other hardware capable of executing software. User interface 116 may include any type or combination of input/output devices, such as a display monitor, graphical user interface, touch-screen or pad, keyboard, and/or mouse. In other embodiments, campaign control systems 108 may include virtual representations of hardware operating, for example, on a virtualization server.

Figure 2:
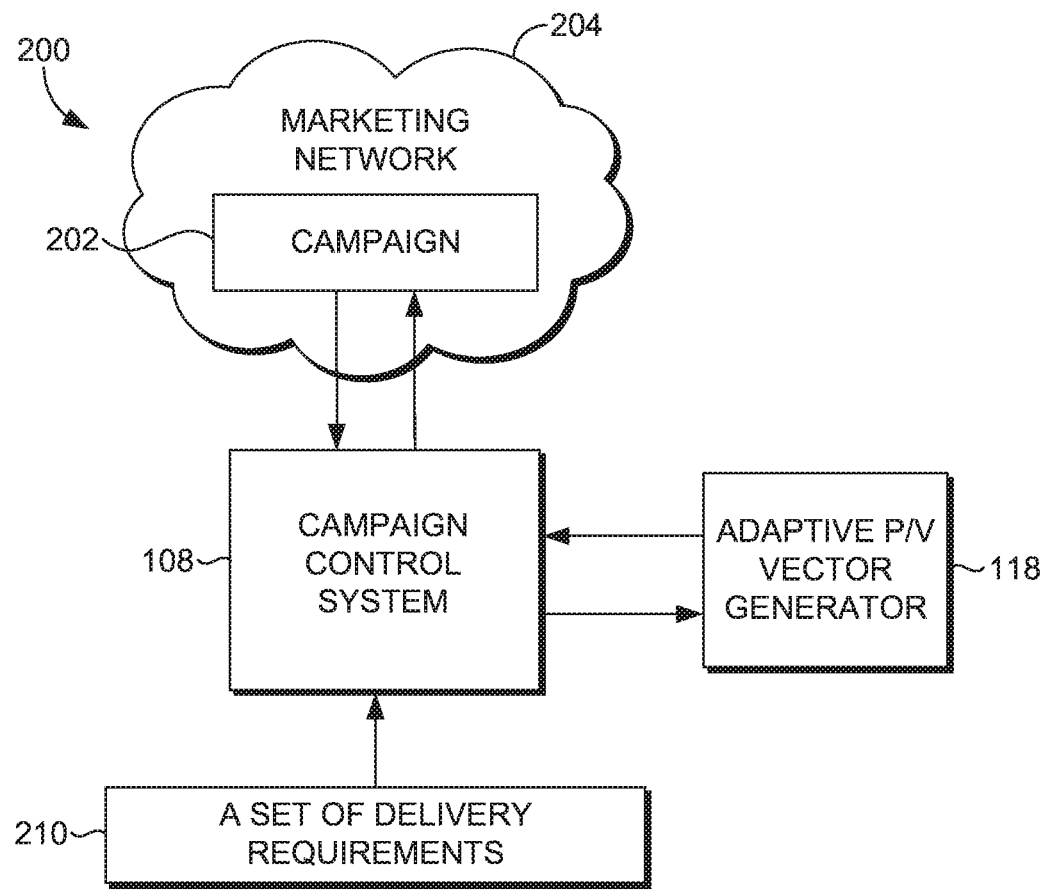
FIG. 2 depicts an illustrative online marketing control system for controlling an online marketing campaign operating in an online marketing network, in accordance with various embodiments of the present disclosure.

FIG. 2 depicts an illustrative online marketing environment 200 for controlling an online marketing campaign 202 operating in an online marketing network 204. Marketing network 204 may include a network or collection of one or more marketers 102, one or more publishers 104, marketing servers 106, campaign control systems 108, adaptive P/V vector generator 118, or other components of system 100. Elements of marketing network 204 may operate to receive impression requests associated with one or more marketing inventories, e.g., from publishers 104 such as websites or other computing components with an inventory of online marketing space. Marketing network 204 may also group impression requests for various marketing campaigns, e.g., according to impressions to be "targeted" based on a combination of attributes defined by the marketing requests. Marketing network 204 may also accept bids (e.g., from one or more campaign control systems 108) on the impression requests and process the bids to serve ads to the impression requests.

Any number or type of marketing campaigns 202 may be operated within marketing network 204, across various marketing servers and domains associated with the Internet. Online marketing environment 200 may be implemented by one or more of the marketers 102, publishers 104, marketing servers 106, and/or campaign control systems 108 described in FIG. 1. For example, online marketing environment 200 may represent the interaction of one or more campaign control systems 108 with other computing components in system 100.

In one embodiment, online marketing environment 200 may include one or more instances of campaign control system 108. Campaign control system 108 may comprise computers or servers connected to the Internet. Such computers or servers may be configured as described with respect to campaign control system 108, as depicted by FIG. 1, or in any other suitable configuration. Alternatively, campaign control system 108 may be implemented by software modules executed by CPUs 114 of campaign control system 108. Campaign control system 108 may be embodied entirely in hardware, entirely in software, or in any combination of hardware and software implemented across any number of computing devices.

Campaign control system 108 may be provided with a set of delivery requirements 210, which may be adjustable design parameters set by a user. For instance, the set of delivery requirements may include cost requirements (e.g., the maximum cost discussed in reference to FIG. 3), pacing requirements (e.g., daily budget goals, daily impression delivery goals), targeting requirements (e.g., based on a demographic analysis) for a target audience, volatility requirements (e.g., desired relative volatility) and/or spread requirements (e.g. to control marketing across inventory units/cells/segments, and/or user targets, etc.). The set of delivery requirements 210 may be implemented by campaign control system 108.

In addition to the set of delivery requirements, campaign control system 108 can also be provided with P/V information. This P/V information can be provided in the form of a vector representation of a P/V curve generated by adaptive P/V vector generator 118. This vector representation of a P/V curve can be provided in response to a request submitted by campaign control system 108 to adaptive P/V vector generator 118. Such a request can identify a target event and a target audience to utilize in generating the vector representation of the P/V curve. Adaptive P/V vector generator 118 can utilize historic information, such as that discussed above, to generate a vector representation of a price volume curve of the target event for the target audience. As mentioned previously, such a vector representation can include a sequence of prices and a corresponding sequence of event volumes of the target event. In embodiments, the prices included within the sequence of prices can be determined such that adjacent prices included within the vector representation are determined based, at least in part, on a difference in volume of the target event between the adjacent prices. The generation of such a vector representation is discussed in greater detail below.

Figure 3:
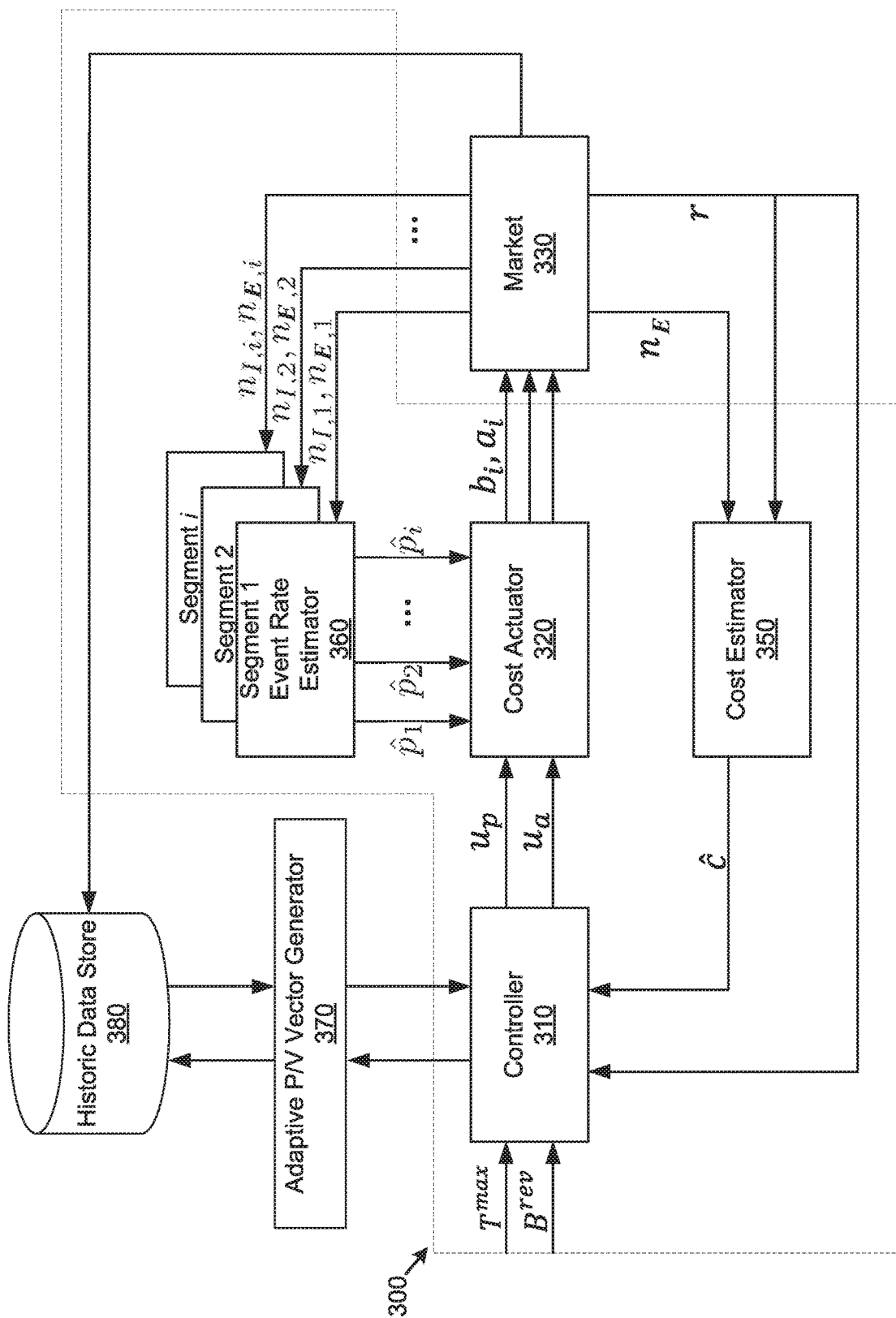
FIG. 3 depicts an illustrative campaign control system, in accordance with various embodiments of the present disclosure.

FIG. 3 depicts a block diagram of a portion of an illustrative campaign control system 300 for controlling online marketing campaigns communicatively coupled with an adaptive P/V vector generator 370, in accordance with various embodiments of the present disclosure. Campaign control system 300 may generally be configured to utilize data previously observed in market 330. This data can be utilized to control subsequent bids placed in market 330 to facilitate, for example, obtaining the desired pacing, and/or delivery, at or below a cost limit set by the marketer. As depicted, campaign control system 300 includes a controller 310 (e.g., campaign control system 108 of FIG. 2), a cost actuator 320, a market 330, a cost estimator 350, and a plurality of segment performance rate estimators 360, an adaptive P/V vector generator 370, and a historic data store 380. Each of these components may be communicatively coupled with one another, for example, as depicted in FIG. 3. This communicative coupling may be, for example, via a bus, network, shared memory, etc., or any combination thereof.

Cost estimator 350 is configured to take as input an observed event volume, $n_E$; and observed revenue, or pacing, r. The observed event volume and the observed revenue can be determined from actual event volume and revenue observed in market 330. The observed event volume and/or the observed revenue may be a moving average calculated over a period of time. This period of time can be any duration of time that may be selected based upon certain campaign characteristics. For example, a shorter period of time can enable quicker reflection of changes in market 330, however the results could be noisier than those of a moving average calculated over a longer period of time. A moving average calculated over a longer period of time, on the other hand, can be less noisy than a moving average calculated over a shorter period of time, but is slow to react to changes in market 330. As a result, the time period for such a moving average may be dependent on the campaign and/or volatility of market 330. The above discussed moving average may be calculated by a moving average filter that could be located in-line between market 330 and cost estimator 350. Discrete observed event volume and observed revenue in market 330 may be monitored, for example, via an event volume sensor and a revenue sensor configured to obtain real-time data about the campaign to which campaign control system 300 is assigned. Cost estimator 350 may produce an estimated cost, ĉ, based, at least in part on, the observed event volume, $n_E$, and the observed revenue, r.

Campaign controller 310 is configured to take as input a max cost reference signal, $T^{max}$, hereinafter merely referred to as max cost. Max cost may be a user (e.g., marketer) defined maximum cost that the user is willing to pay for an event. As used herein, event refers to any action taken with an advertisement (e.g., impression, click, or conversion). In embodiments, max cost may represent the maximum average cost the user is willing to pay for each event, the maximum discrete cost the user is willing to pay for each event, or any other suitable cost restriction.

Campaign controller 310 is also configured to take as input a desired pacing reference signal, $B^{rev}$. Desired pacing may be user defined and may also be referred to as a maximum desired revenue or a maximum budget. As used herein, revenue may refer to actual dollars spent or actual events delivered. As such, desired pacing may be expressed as monetary units (e.g., dollars) or as a number of events. For example, if a marketing campaign has a daily budget of $900 and has spent $800 in a given day, observed pacing for the campaign on that given day is $800. Campaign controller 310 is also configured to take as input the observed pacing, r, and the cost estimate, ĉ, which was produced by cost estimator 350.

Campaign controller 310 is configured to determine a price control signal, $u_p$. Once control system 300 has been operating for a period of time, the price control signal, $u_p$, can be calculated by campaign controller 310 based, at least in part, on the max cost and the desired pacing, in addition to observed pacing, r, and the estimated cost, ĉ. However, during the time period when campaign controller 310 first begins operating, there is no observed pacing, r, from market 330 to utilize in determining the price control signal, $u_p$. In addition, as mentioned above, cost estimator 350 utilizes observed event volume, $n_E$ and observed revenue, r, to determine the estimated cost, ĉ. Neither the observed event volume nor the observed pacing, are available when control system 300 first begins operating. As a result of these considerations, campaign controller 310 may need to rely on historic data from market 330 to initially determine a price signal that is calculated to facilitate obtaining the desired pacing within the limits of max cost and/or inventory available in market 330.

As used herein, historic data, with respect to a marketing campaign, refers to data collected prior to the implementation, or operation, of the marketing campaign. This is as opposed to observed data, which refers to data that is observed while the marketing campaign is operating. This historic data can be acquired by campaign controller 310 submitting a request (e.g. to adaptive p/v vector generator 370 discussed below) to acquire the historic data. Such historic data can be stored in historic data store 380. In embodiments, historic data store 380 can include data collected across any number of marketing campaigns. This data can include information on each impression that was delivered within market 330, including a price of each impression (e.g., clearing price), additional events that the impression lead to (e.g., click-through, conversion, viewed, etc.), and audience information for the impression (e.g., website, location information, demographic information, etc.).

In embodiments, the above discussed historic data can take the form of a P/V curve that correlates a range of prices with corresponding volumes of an event that resulted from respective prices within the range of prices. One mechanism for providing such a P/V curve is to equally divide the range of prices into increments (e.g., into $0.01 price increments) and to determine an event volume corresponding with each increment. Such a mechanism, however, does not take into account that certain prices segments within the price range yield higher magnitude event volume changes than other price segments within the price range, which may yield little to no change in magnitude with respect to event volume. As a result, a great deal of processing time can be wasted calculating event volumes for adjacent price increments without regard to the change in volume that the adjacent price increments yield. In addition, such a mechanism can provide a large quantity of data. For example, if the price range spans from $0.00 to $20.00, then the resulting data, at $0.01 increments, would include a total of 2,000 points of price data and another 2,000 points of corresponding volume data. As such, in addition to the processing considerations above, a great deal of bandwidth can be taken up in transmitting this quantity of data. Because of these considerations, the above mechanism does not scale well as more and more requests for P/V information are received and processed.

In embodiments of the present disclosure, adaptive P/V vector generator 370 is configured to generate a vector representation of a P/V curve such that adjacent prices that are included within the vector representation are selected based, at least in part, on a difference in magnitude in volume of a target event for a target audience that occurs between the adjacent prices. Furthermore, prices that fall between these adjacent prices need not be analyzed, saving a great deal of computational resources. In addition a great deal of bandwidth savings can also be realized by only transmitting those prices that are included within the vector representation of the P/V curve. Example methods for generating such a vector representation are discussed below in reference to FIGS. 4-7.

As mentioned above, campaign controller 310 is configured to determine a price control signal, $u_p$, based on the above described input data. Such a price control signal can be determined by any suitable function. In embodiments, such a function may be configured to attempt to facilitate obtaining the desired pacing within the limits of max cost and/or inventory available in market 330. Such functions are known in the art and will not be discussed further herein. In some embodiments, an allocation control signal, $u_a$, can also be calculated by campaign controller 310. Such an allocation control signal represents the percentage or ratio (e.g., point value from 0 to 1) of inventory the ad campaign is willing to purchase at the bid price discussed below.

In some embodiments, campaign controller 310 is configured to periodically update the price control signal, $u_p$, as well as allocation control signal, $u_a$, if utilized. These periodic updates may take place at predefined time intervals (e.g., every 15 minutes), based on a specific occurrence (e.g., based on a magnitude of change to observed pacing), or any other suitable period. In other embodiments, campaign controller 310 may update the price control signal, $u_p$, in real time as the above discussed signals change.

Segment performance rate estimators 360 are configured to take as input an observed impression volume for a segment, $n_{I,i}$, and an observed event volume for the segment, $n_{E,i}$. The 'i' refers to the segment in which the observed impression volume and the observed event volume were observed. As used herein a segment refers to a defined portion of market 330. Such a segment may be, for example, a website, a group of individuals identified by demographic analysis (e.g., males between the age of 25 and 35 in California), a distinct individual, etc. A segment may also e.g. be referred to in the art, and herein, as a cell or unit. The observed impression volume, $n_{I,i}$, and the observed event volume, $n_{E,i}$ for each segment can be determined from actual observations in market 330 pertaining to the respective segment. Discrete observed impression volumes for the segments and discrete observed event volumes for the segments may be monitored in market 330, for example, via segment impression sensors (not depicted) and segment event sensors (not depicted), respectively, configured to obtain real-time data about the segment to which these components are assigned. Segment performance rate estimator 360 can output a performance prediction, $\hat{p}_i$, for each segment ('i').

Cost actuator 320 takes the price control signal, $u_p$, and allocation control signal, $u_a$, as input. In addition, cost actuator 320 can take the one or more segment performance predictions, $\hat{p}_i$, as input. Again, the 'i' refers to the segment to which the segment performance prediction belongs. Cost actuator may utilize the combination of the price control signal, $u_p$, the allocation signal, $u_a$, and the segment performance predictions, $\hat{p}_i$, to calculate a bid price, $b_i$, and an allocation at that bid price, $a_i$, for the respective segment. In some embodiments, the bid price, $b_i$, is calculated by taking the product of $u_p$ and $\hat{p}_i$, for each i. These bids are depicted by the individual arrows flowing from cost actuator 320 to market 330. In other embodiments, the bid price may be a capped segment bid price calculated, for example, using the equation $b_i=\min(\text{maxCPI}, u_p\hat{p}_i)$, where maxCPI is max cost per impression, or, as another example, equation $b_i=\min(\text{maxCPI}_i, u_p\hat{p}_i)$, where $\text{maxCPI}_i$ is max cost per impression for segment i. It will be appreciated by someone of ordinary skill in the art that these examples are merely meant to illustrative and are not intended to limit the scope of this disclosure. For example, min can be replaced by max and/or the min (max) operation may be conditional based on user, ad, or impression specific information. In addition, the capping may apply only for a certain type of user, a certain time of the day, in a certain geographic region, etc.

Market 330 represents a bidding environment in which advertisers place ad requests for marketing space that is offered by publishers. The above discussed components facilitate a marketer in obtaining the desired pacing within the limits of max cost $T^{max}$ and/or inventory available in marketing market 330.

FIG. 4 depicts illustrative pseudo code for main function 400 that can be utilized for producing a vector representation of a P/V curve, in accordance with various embodiments of the present disclosure. The main function 400 is defined at line 402 where it can be seen that a handle for the main function is defined as "fAdaptivePVcurveSimulator," and that this function returns a vector including a priceSet and a volumeSet that are determined within the function.

Code section 404 defines configuration parameters for determining the vector representation of the P/V curve. It will be appreciated that the values for these configuration parameters are merely meant to be illustrative of possible values. The values of these configuration parameters can vary depending on any number of considerations. As a result, the depicted values should not be taken as limiting of this disclosure. The first configuration parameter, "priceLow," depicted in line 406, represents a minimum price value desired for the vector representation of the P/V curve. The second configuration parameter, "priceHigh," depicted in line 408, represents a maximum price value desired for the vector representation of the P/V curve. In a specific embodiment, priceLow and priceHigh can be selected to attempt to ensure a full volume range of the vector representation of the P/V curve. For example, priceLow can be selected to be equal to, or below, a price at which any desired inventory would be awarded, and priceHigh can be selected to be equal to, or above, a highest price anticipated for the desired inventory (i.e., the inventory is exhausted). In such an embodiment, the volume for the desired inventory that was exchanged in the market awarded between priceLow and priceHigh would represent 100% of the available volume.

The third configuration parameter, "minDeltaPrice," depicted in line 410, represents a minimum desired difference in price between adjacent members of the vector representation of the P/V curve. The depicted minDeltaPrice is '0.01.' As such, the minimum distance between adjacent prices within the representation of the P/V curve produced by main function 400 would be $0.01. The fourth configuration parameter, "maxRelDeltaVolume," depicted in line 412, represents a maximum relative difference in volume that is desired from one member to the next member of the vector representation of the P/V curve. As depicted, the maxRelDeltaVolume is 0.05 which indicates the maximum difference in magnitude from one member to the next member is 5%. The fifth configuration parameter, "minDeltaVolume," depicted in line 414, represents a minimum difference in volume that is desired between adjacent members of the vector representation of the P/V curve. As depicted, the minDeltaVolume is '100.' As will be seen in the discussion of FIG. 5, the third, fourth, and fifth configuration parameters can act as termination criteria for recursively partitioning P/V information to produce a representation of a P/V curve. It will be appreciated that the configuration parameters discussed above can be user defined parameters (e.g., through user input), pre-defined parameters (as depicted), dynamically learned parameters (e.g., via machine learning algorithms), programmatically defined parameters, or parameters defined in any number of other ways.

Code section 418 generates the vector representation of the P/V curve utilizing the above discussed configuration parameters. At line 420, the priceLow configuration parameter is added to the priceSet vector as a first member of the priceSet vector. At line 422, the function "fVolume" is utilized. The fVolume function is configured to return a cumulative count of a target event, also referred to as a volume of the event, for a target audience that occurs below a price parameter that is passed to the fVolume function. In embodiments, the fVolume function can include parameters for the target audience and target event that are determined based on a request for a representation of a P/V curve. Such a target event can be, for example, impressions, clicks, conversions, views, etc. Such a target audience can include target demographic information, target websites, or any other suitable information for defining a target audience. As can be seen, the fVolume function in line 422 is utilized to determine a count of the events that occurred below priceLow, or '0' in this example. The count returned by fVolume in line 422 is assigned as the first member of the volumeSet vector. As such, the first member of the priceSet vector identifies priceLow and the first member of the volumeSet vector identifies an event volume at priceLow.

At line 424, the function "fAdaptivePVvectorGenerator" is invoked. As can be seen, the configuration parameters discussed above in reference to code section 404 along with priceSet and volumeSet are passed as input to fAdaptivePVvectorGenerator. The function fAdaptivePVvectorGenerator can be configured to add intermediate prices and volumes for those intermediate prices to priceSet and volumeSet, respectively, to form a vector representation of the P/V curve. As used in this context, an intermediate price refers to a price that falls between priceLow and priceHigh.

Figure 7:
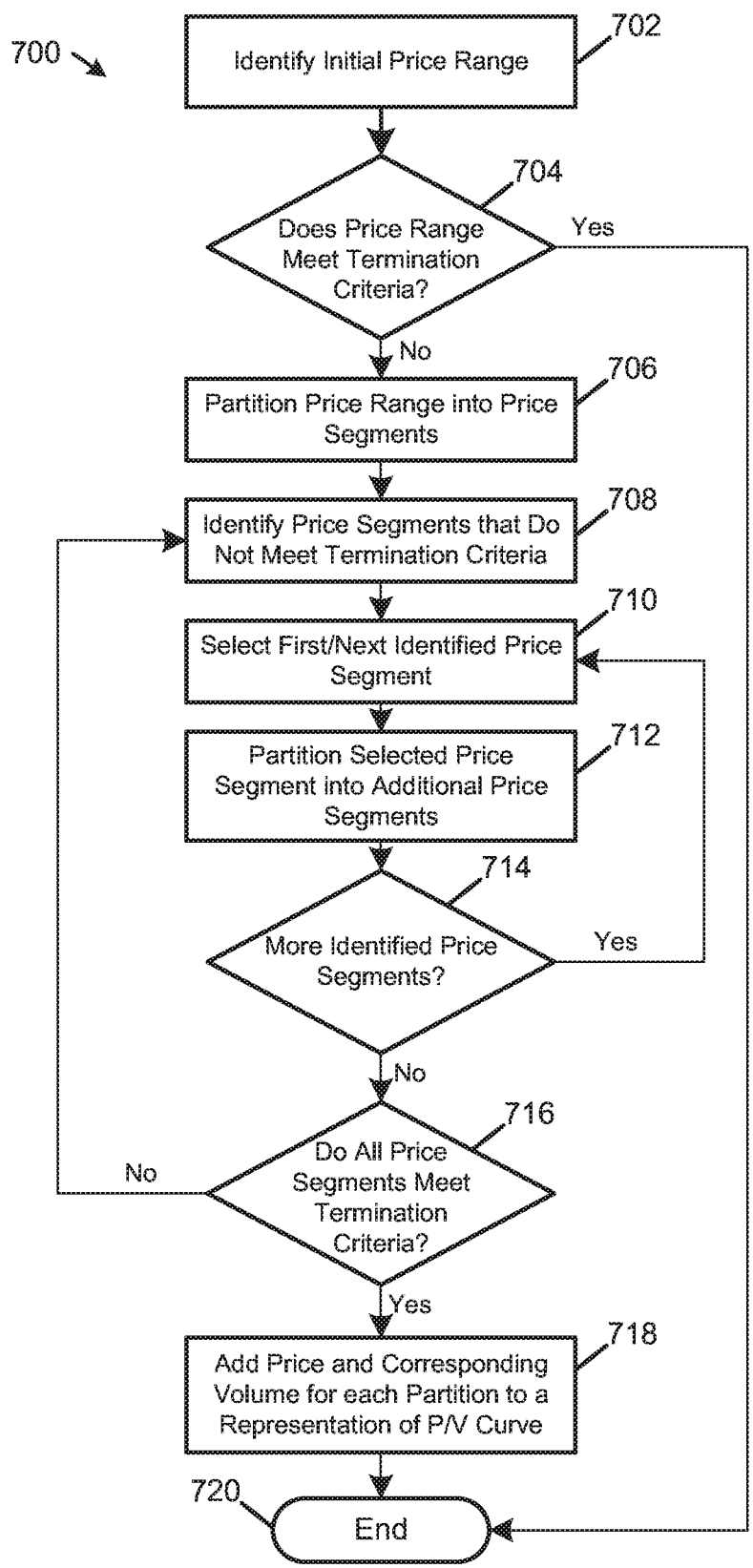
FIG. 7 depicts an illustrative process flow for generating an adaptive representation of a P/V curve, in accordance with various embodiments of the present disclosure.

In embodiments, fAdaptivePVvectorGenerator can accomplish this by iteratively, or recursively, partitioning the prices between priceLow and priceHigh such that adjacent prices within priceSet are determined based on a magnitude of difference in volume of the target event between the adjacent prices. For example, in one embodiment, the difference in volume between any two adjacent prices may be desired to be less than a predefined threshold. An example of such a function is depicted in FIG. 5, discussed below, and an example iterative process flow is depicted by FIG. 7. It will be appreciated that once fAdaptivePVvectorGenerator completes processing, that priceSet will include priceLow, along with a selection of intermediate prices, and volumeSet will include volumes that correspond with the prices included in priceSet.

At line 426, the priceHigh configuration parameter is added to the priceSet vector as a last member of the priceSet vector. In addition, at line 428, the function fVolume is utilized to identify a volume of the target event that corresponds with priceHigh, or '20.' The volume returned by fVolume in line 428 is assigned as the last member of the volumeSet vector. As such, the last member of the priceSet vector identifies priceHigh and the last member of the volumeSet vector identifies an event volume at priceHigh.

FIG. 5 depicts pseudo code for an illustrative fAdaptivePVvectorGenerator function 500, hereinafter function 500 for ease of reference. Function 500 can be utilized in producing a vector representation of a P/V curve, in accordance with various embodiments of the present disclosure. Function 500 is defined at line 502 where it can be seen that function 500 returns a vector including a priceSet and a volumeSet that are determined within the function. In addition, function 500 takes as parameters the configuration parameters discussed in reference to code section 404 of FIG. 4, along with priceSet and volumeSet. As discussed above in reference to FIG. 4, priceSet and volumeSet may already include priceLow and an event volume that corresponds with priceLow, respectively.

In code section 504 various variables utilized in function 500 are initialized. As can be seen at line 506, a variable volumeLow is initialized, utilizing the fVolume function discussed above in reference to FIG. 4, to a volume that corresponds with the priceLow parameter passed to function 500. Similarly, at line 508 volumeHigh is initialized to a volume that corresponds with the priceHigh parameter passed to function 500. At line 510, a deltaVolume variable is initialized to reflect a difference in magnitude between the above determined volumeHigh and volumeLow. Likewise, a deltaPrice variable is initialized to reflect a difference in magnitude between priceHigh and priceLow.

Moving to code sections 514 and 516, code section 514 represents an 'if' statement that when satisfied results in the body of the if statement, represented by code section 516, being executed. As can be seen, code section 514 includes two alternative conditions represented by 518 and 522 joined by a logical 'or' operator 520. As such, if either of conditions 518 or 522 is met, processing would proceed to code block 516. Each of conditions 518 and 522 include a number of criteria that would be evaluated to determine if either of these conditions is met. It will be appreciated that the depicted criteria and conditions are merely meant to be illustrative and that additional or fewer conditions and/or criteria for each condition can be utilized without departing from the scope of this disclosure.

Beginning with condition 518, the first criteria is represented by 'volumeLow=0,' the second criteria is represented by 'deltaPrice>minDeltaPrice,' and the third criteria is represented by 'deltaVolume>minDeltaVolume.' Because these criteria are joined by a logical 'and' operator, represented by '&&,' all of these criteria would need to evaluate to 'true' in order for condition 518 to be met. As such, the volumeLow would need to equal '0,' the difference in magnitude between priceHigh and priceLow would need to exceed the minDeltaPrice, and the difference in magnitude between volumeLow and volumeHigh would need to exceed the minDeltaVolume. If all of these criteria are true, then processing can proceed to code section 516. If any of these criteria are false, then condition 522 would need to be evaluated.

With respect to condition 522, the first criteria is represented by 'deltaVolume/(volumeLow+1)>maxRelDeltaVolume,' the second criteria is represented by 'deltaPrice>minDeltaPrice,' and the third criteria is represented by 'deltaVolume>minDeltaVolume.' Again, because these criteria are joined by a logical 'and' operator, all of these criteria would need to evaluate to 'true' in order for condition 522 to be met. As such, the percentage difference between volumeLow and volumeHigh would need to exceed maxRelDeltaVolume multiplied by 100 to arrive at a percentage, the difference in magnitude between priceHigh and priceLow would need to exceed the minDeltaPrice, and the difference in magnitude between volumeLow and volumeHigh would need to exceed the minDeltaVolume. If all of these are true, then processing can proceed to code section 516. If any of these criteria are false, and any of the criteria for condition 518 are false, then the processing would proceed to lines 544 and 546 where the processing of function 500 would be terminated. As such, the criteria contained in conditions 518 and 522 can be considered termination criteria.

If either of conditions 518 or 522 are met then the processing can proceed to line 524. At line 524 a variable 'priceMidPoint' is set to the midpoint between priceLow and priceHigh. For example, when utilizing the initial configuration parameters for priceLow, 0, and priceHigh, 20, discussed above in reference to FIG. 4, the first priceMidPoint would be 10. At line 526, a variable 'volumeMidPoint' is initialized, utilizing the fVolume function, to a volume that corresponds with the priceMidPoint.

At line 532, function 500 is recursively called where the priceLow is maintained at priceLow, as indicated by 530, however priceHigh is now passed as priceMidPoint, as indicated by 532. As such, the price range is divided into a first segment from priceLow to priceMidPoint, and this first segment is passed back into function 500 to have the above described analysis performed again. At line 534, the priceMidPoint is added to priceSet, and the corresponding volume is added to volumeSet at line 536.

Similar to line 532, at line 538, function 500 is again recursively called. In this instance, however, priceLow becomes priceMidPoint, as indicated by 540, and priceHigh is maintained as priceHigh, as indicated by 542. As such, the price range is divided into a second segment from priceMidPoint to priceHigh, and this second segment is passed back into function 500 to have the above described analysis performed again. As a result of the above, priceMidPoint can be referred to as a partition between the above mentioned first and second segments.

It will be appreciated that the recursive processing will continue to partition the price range initially passed into function 500 by main function 400 of FIG. 4 until at least one of the criteria from each of conditions 518 and 522 evaluate to false. It will also be appreciated that, for each recursive call another member would be added to priceSet and volumeSet by lines 534 and 536. As such, function 500 would assemble the priceSet and volumeSet from the priceMidPoint and volumeMidPoint calculated by lines 524 and 526, respectively.

As an example, assume function 500 is invoked six times based on the priceLow and priceHigh defined in lines 406 and 408 before at least one of the criteria from each of conditions 518 and 522 evaluate to false for each of the resulting partitions. In such a scenario, the priceSet would include a total of eight members once completely assembled. Two of these eight members would be added by main function 400 and would represent the initial priceLow and priceHigh defined within main function 400. As a result, six members would have been added by function 500. A resulting priceSet could be represented as [0, 2.5, 5, 7.5, 10, 12.5, 15, 20], where '0' and '20' are added by main function 400 and the intermediate members are added by function 500. A corresponding volumeSet would be represented by [fVolume(0), fVolume(2.5), fVolume(5), fVolume(7.5), fVolume(10), fVolume(12.5), fVolume(15), fVolume(20)].

Figure 6:
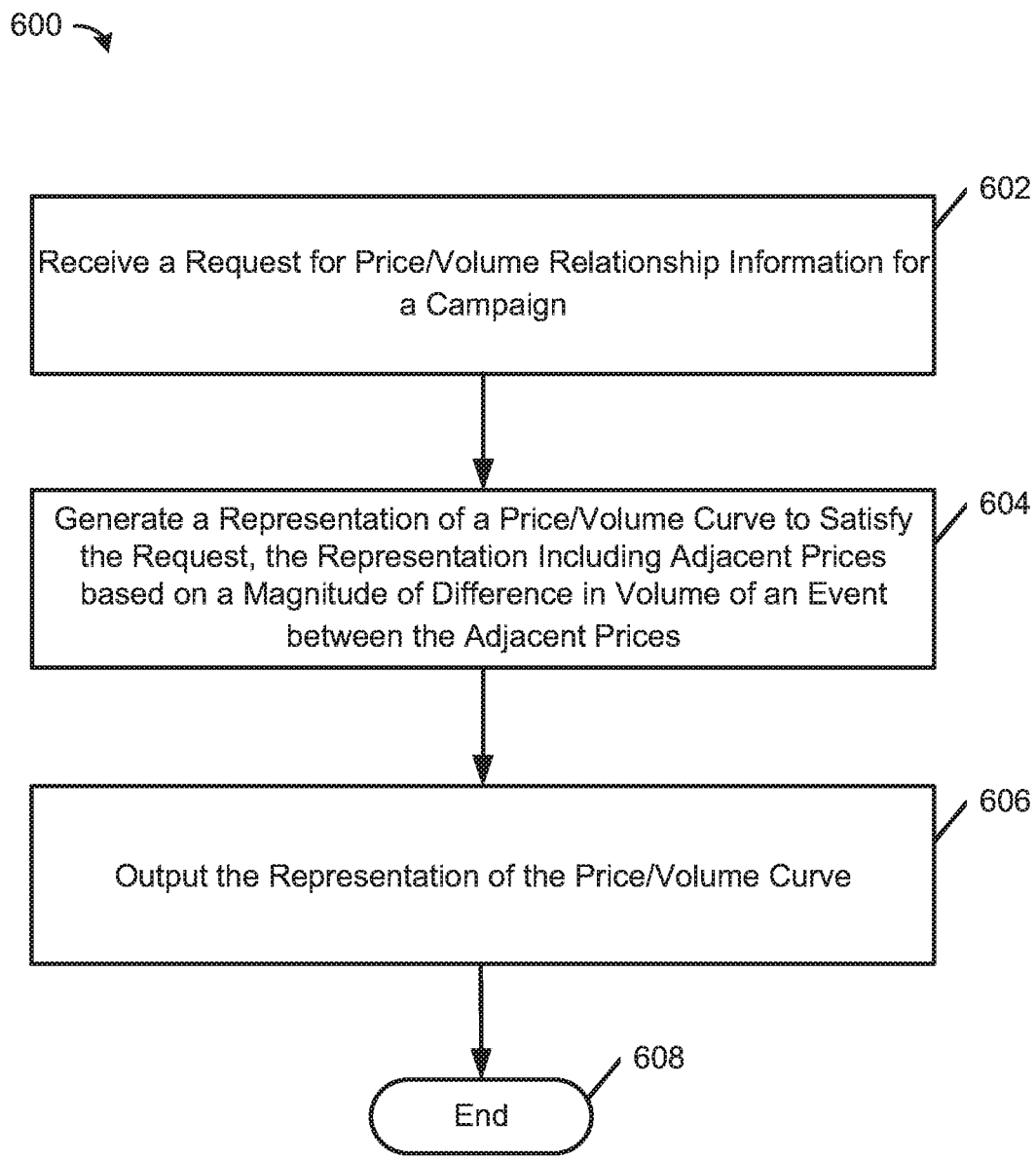
FIG. 6 depicts an illustrative process flow for processing a request for a vector representation of a P/V curve, in accordance with various embodiments of the present disclosure.

FIG. 6 depicts an illustrative process flow 600 for processing a request for a vector representation of a P/V curve, in accordance with various embodiments of the present disclosure. Process 600 may be performed by processing logic that comprises hardware (e.g., circuitry, dedicated logic, programmable logic, microcode, etc.), software (e.g., instructions run on a processing device to perform hardware simulation), or any combination thereof and configured to provide cost estimates. As such, process 600 may be performed by a computing device, e.g., computing device 900 of FIG. 9, to implement one or more embodiments of the present disclosure. It will be appreciated that process 600 can have fewer or additional operations, or perform some of the operations in different orders without departing from the scope of this disclosure.

In various embodiments, the process begins at block 602, where a request for price/volume relationship information is received for a marketing campaign. This request can be received, for example, from a campaign control system (such as those discussed herein) or from a dashboard (e.g., dashboard 122 of FIG. 1). Such a request can include an identifier for a target event (e.g., impression, view, click, conversion, etc.) and a target audience (e.g., target demographic information, target websites, frequency cap information defining a maximum frequency for which a specific user is to be served an ad within a specified time interval, etc.).

At block 604, a representation of a P/V curve of the target event for the target audience can be generated. The representation of the P/V curve can include a sequence of prices where adjacent prices are included within the sequence based, at least in part, on a magnitude of difference in volume of the target event between the adjacent prices. In some embodiments, the representation of the P/V curve can be generated recursively (as discussed in reference to FIG. 5, above, or iteratively as discussed in reference to FIG. 7, below).

At block 606, the representation of the P/V curve can be output to the requestor. As mentioned above, such a requestor can include a campaign control system. The representation of the P/V curve can enable the campaign control system to determine an initial bid calculated, utilizing the representation of the P/V curve, to achieve a desired pacing. In addition, such a requestor can include a dashboard being utilized by a marketer. The representation of the P/V curve can aid a user of the dashboard in determining aspects of an online marketing campaign that includes the target audience.

For example, if the user is wishing to target an audience including only males in California at a selected max cost, the representation of the P/V curve can help the user determine if a desired pacing can be achieved with respect to that target audience within the constraints of the selected max cost. If the representation of the P/V curve indicates that the desired pacing cannot be achieved for the target audience within the max cost constraints, then the user can decide to adjust the target audience (e.g., include Arizona as well as California), adjust the max cost constraint (e.g., increase the max cost if the inventory is not exhausted to try to gain additional inventory), or reduce the desired pacing.

It will also be appreciated that such a representation of a P/V curve can also be utilized to troubleshoot a campaign that is not performing as intended. In such an embodiment, an operator of the campaign control system can request a representation of a P/V curve to be utilized to determine if the performance is related to a abnormalities in the expected P/V relationship.

FIG. 7 depicts an illustrative process flow 700 for generating an adaptive representation of a P/V curve, in accordance with various embodiments of the present disclosure. Process 700 may be performed, for example, by adaptive P/V vector generator 118 of FIGS. 1 & 2 or adaptive P/V vector generator 370 of FIG. 3. In various embodiments, process 700 may be performed in reference to block 604 of FIG. 6.

Process flow 700 may begin at block 702, where an initial price range for the representation of the P/V curve is determined. This may be accomplished through input by a user defining a specific range, utilizing a default range, or dynamically searching historic data to identify an appropriate range. It will be appreciated that, in some embodiments, the price range may be selected such that the lowest price of the price range is below any awarded event volume for a target audience and the highest price of the price range is above any awarded event volume for the target audience. In such embodiments, the price range would encompass 100% of the applicable event volume for the target audience.

At block 704, a determination is made as to whether the price range meets specified termination criteria. Such termination criteria can correspond, for example, to any of the configuration parameters discussed in reference to FIGS. 4 and 5. As such, the termination criteria can include a minimum difference in price between adjacent price points within the representation of the P/V curve (e.g., minDeltaPrice), a maximum percentage difference for event volume between adjacent price points within the representation of the P/V curve (e.g., maxRelDeltaVolume), and/or a minimum difference in event volume between adjacent price points included within the representation of the P/V curve (e.g., minDeltaVolume). It will be appreciated that additional, or alternative, termination criteria could also be included without departing from the scope of this disclosure.

If the price range meets the termination criteria, then the processing proceeds to block 720 where the processing ends. If on the other hand, the price range does not meet the termination criteria, then the processing proceeds to block 706 where the price range is partitioned. In some embodiments, the price range is partitioned based on a mid-point of the price range, such that the price range is divided into two substantially equal price segments. In other embodiments, the price range may be divided in another manner.

At block 708 price segments that do not meet the termination criteria mentioned above are identified. Such identification could be accomplished utilizing similar logic to that depicted in code section 514, although it will be appreciated that variations on such logic are expressly contemplated by this disclosure. At block 710 a first, or next, identified price segment is selected. At block 712, the selected price segment is further partitioned into additional price segments. Such partitioning could be accomplished in a similar manner to that described above in reference to block 706.

At block 714, a determination is made as to whether there are any more identified price segments. If there are more identified price segments, then the processing proceeds back to block 710, where the next identified price segment is selected and the operations of block 710 and 712 are repeated. If there are no more identified price segments, then processing proceeds to block 716 where a determination is made as to whether all price segments that resulted from the processing described above meet the termination criteria. If any price segments do not meet the termination criteria, then the processing returns to block 708 where the above described processes are repeated.

If all price segments meet the termination criteria, then processing proceeds to block 718 where a price and associated volume for each partition are added to a representation of a P/V curve. Such a representation may be, for example, a vector. As used in this context, a vector can take any form that is suitable for correlating each price with a corresponding volume. As such, the vector could be a two dimensional array where one dimension represents price and the second dimension represents the corresponding volume. In other embodiments, the vector could be two one dimensional arrays having a corresponding number of members. In these embodiments, one array would represent price and the second array would represent the corresponding volume, and the price can be correlated to the corresponding volume based on the respective locations within each array. It will be appreciated that, in other embodiments, the cost and corresponding volume for each partition could also be added after each of the above partitioning operations (e.g., after 706 and 712). In such an embodiment, there is a possibility that an ordering operation would be needed to get the prices in ascending order to accurately represent the P/V curve. Once block 718 is complete, the processing can proceed to block 720 where the processing can end.

Figure 8:
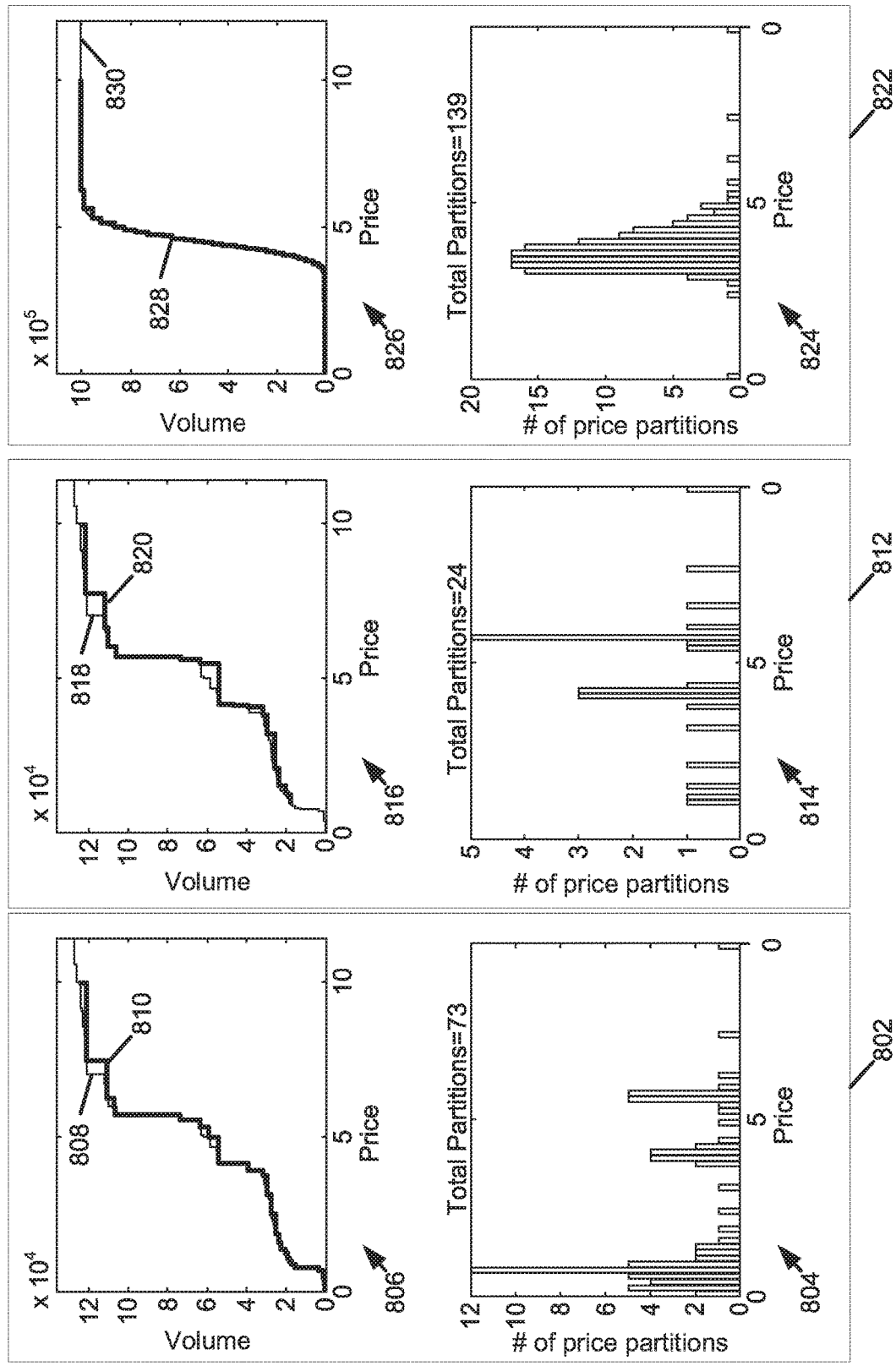
FIG. 8 depicts example graphs, in accordance with various embodiments of the present disclosure.

FIG. 8 depicts three example sets of graphs 802, 812, and 822 that depict actual P/V curves, representation of P/V curves, and the resulting number of partitions utilized to generate the representation of the P/V curves. As depicted in example graph set 802, the thinner line 808 represents the actual P/V curve and the thicker line 810 represents the representation of the P/V curve for a price range between 0 and 10. As can be seen in graph 804, the representation of the P/V curve utilizes a mere 73 partitions to generate the representation of the P/V curve. It will also be noted that the partitions are clustered around areas of change to the volume of the P/V curve, rather than evenly distributed across the price range depicted.

As depicted in graph 816 of example graph set 812, the thinner line 818 represents the actual P/V curve and the thicker line 820 represents the representation of the P/V curve for a price range between 0 and 10. As can be seen in graph 814, the representation of the P/V curve utilizes a mere 24 partitions to generate the representation of the P/V curve. It will again be noted that the partitions are clustered around areas of change to the volume of the P/V curve, rather than evenly distributed across the price range depicted.

As depicted in graph 826 of example graph set 822, the thinner line 830 represents the actual P/V curve and the thicker line 828 represents the representation of the P/V curve for a price range between 0 and 10. As can be seen in graph 824, the representation of the P/V curve utilizes a total of 139 partitions to generate the representation of the P/V curve. It will again be noted that the partitions are clustered around areas of change to the volume of the P/V curve, rather than evenly distributed across the price range depicted.

It should be recognized that, while each of graphs 806, 816, and 826 are for the same price range, 0-10, that the number of partitions needed to represent the corresponding P/V curves vary from example to example. It will also be appreciated that, utilizing the mechanism described above which would represent the P/V curve utilizing equally spaced partitions across a price range would have represented each of these graphs utilizing the same number of partitions. In the example mentioned above where each graph is represented utilizing $0.01 increments, each of these graphs would have been represented by 1,000 partitions. As such, the representation of the P/V curves described herein results in representations of P/V curves that are orders of magnitudes less than such a mechanism, which greatly reduces the processing requirements to produce the representation of the P/V curve as well as the bandwidth to transmit such a representation.

Figure 9:
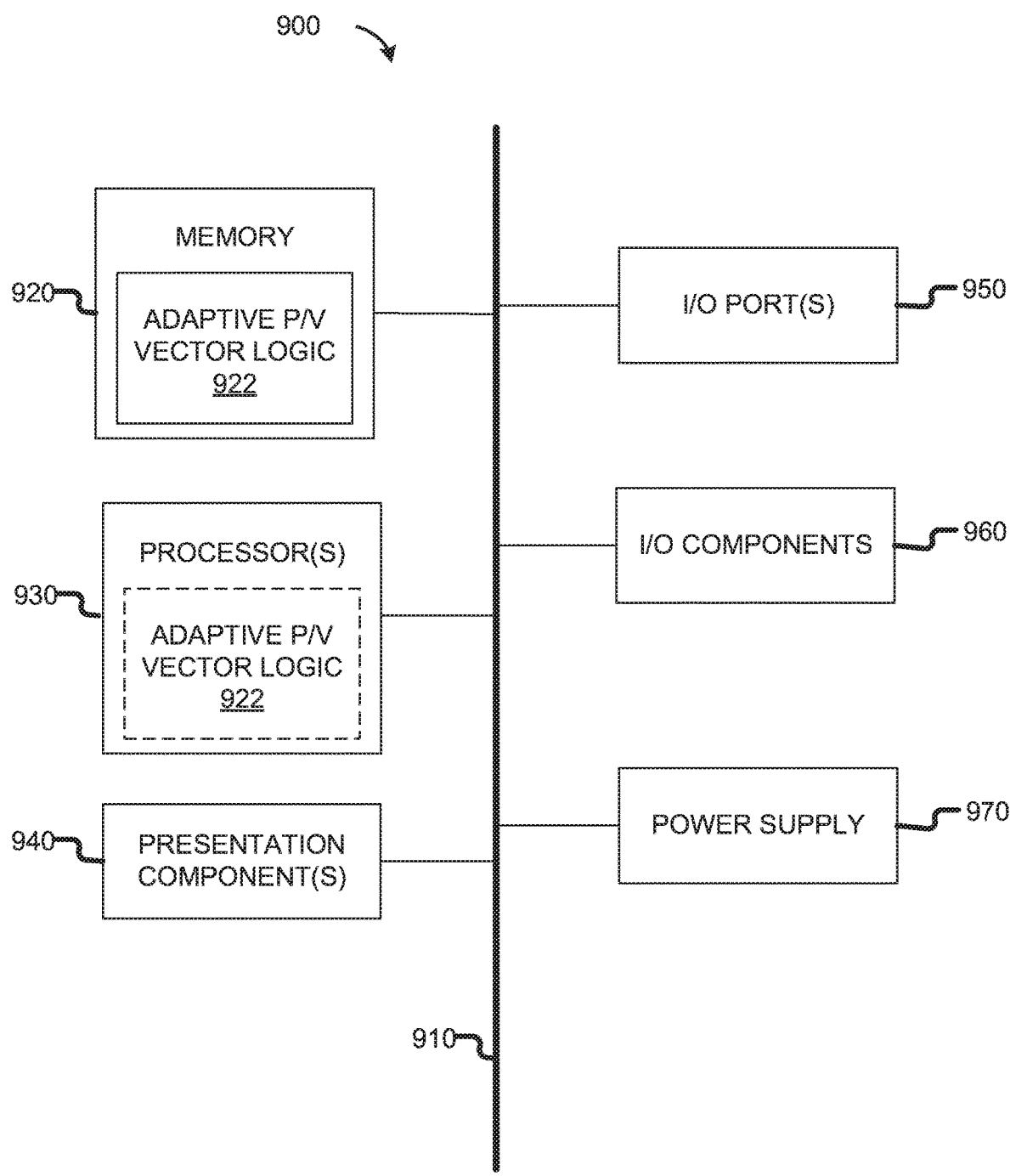
FIG. 9 is a block diagram of an example computing device in which various embodiments of the present disclosure may be employed.

Having described embodiments of the present invention, an example operating environment in which embodiments of the present invention may be implemented is described below in order to provide a general context for various aspects of the present invention. Referring to FIG. 9, an illustrative operating environment, or computing platform, for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialized computing devices, etc. The invention may also be practiced in distributed computing environments where tasks are performed by remote-processing devices that are linked through a communications network.

With reference to FIG. 9, computing device 900 includes a bus 910 that directly or indirectly couples the following devices: memory 920, one or more processors 930, one or more presentation components 940, input/output (I/O) ports 950, I/O components 960, and an illustrative power supply 970. Bus 910 represents what may be one or more busses (such as an address bus, data bus, or combination thereof). Although depicted in FIG. 9, for the sake of clarity, as delineated boxes that depict groups of devices without overlap between these groups of devices, in reality this delineation is not so clear cut and a device may well fall within multiple ones of these depicted boxes. For example, one may consider a display to be one of the one or more presentation components 940 while also being one of the I/O components 960. As another example, processors have memory integrated therewith in the form of cache; however, there is no overlap between the one or more processors 930 and the memory 920. A person having ordinary skill in the art will readily recognize that such is the nature of the art, and it is reiterated that the diagram of FIG. 9 merely depicts an illustrative computing device that can be used in connection with one or more embodiments of the present invention. It should also be noticed that distinction is not made between such categories as "workstation," "server," "laptop," "hand-held device," etc., as all such devices are contemplated to be within the scope of computing device 900 of FIG. 9 and any other reference to "computing device," unless the context clearly indicates otherwise.

Computing device 900 typically includes a variety of computer-readable media. Computer-readable media can be any available media that can be accessed by computing device 900 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 920 includes computer-storage media in the form of volatile and/or nonvolatile memory. The memory may be removable, non-removable, or a combination thereof. Typical hardware devices may include, for example, solid-state memory, hard drives, optical-disc drives, etc. Computing device 900 includes one or more processors 930 that read data from various entities such as memory 920 or I/O components 960. Presentation component(s) 940 present data indications to a user or other device. Illustrative presentation components include a display device, speaker, printing component, vibrating component, etc.

In various embodiments, memory 920 includes, in particular, temporal and/or persistent copies of adaptive P/V vector logic 922. Adaptive P/V vector logic 922 includes instructions that, when executed by one or more processors 930, result in computing device 900 performing any of the processes and/or actions described above in reference to adaptive P/V vector generator 118 of FIGS. 1 & 2, adaptive P/V vector generator 380 of FIG. 3, process flow 400 of FIG. 4, and/or process flow 500 of FIG. 5.

In some embodiments, one or more processors 930 may be packaged together with cost estimation logic 922. In some embodiments, one or more processors 930 may be packaged together with cost estimation logic 922 to form a System in Package (SiP). In some embodiments, one or more processors 930 can be integrated on the same die with cost estimation logic 922. In some embodiments, processor 930 can be integrated on the same die with cost estimation logic 922 to form a System on Chip (SoC).

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method for initializing a campaign control system comprising:
   receiving, from a campaign control system, a request for price/volume relationship information, the request including an identifier of a target audience;
   determining a plurality of prices associated with one or more volumes based on previously collected price/volume data of an event for the target audience;
   defining a plurality of configuration parameters, wherein the plurality of configuration parameters comprises a first configuration parameter representative of a minimum difference in price between adjacent members of a representation of a price/volume curve, a second configuration parameter representative of a maximum difference in volume between adjacent members of the representation of the price/volume curve, and a third configuration parameter representative of a minimum difference in volume between adjacent members of the representation of the price/volume curve;
   responsive to the request for price/volume relationship information from the campaign control system, generating a representation of the price/volume curve based on the plurality of prices associated with the one or more volumes and the plurality of configuration parameters, wherein the generating comprises determining a first price within the representation of the price/volume curve based on a determination that a difference between the first price and a second price adjacent to the first price meets the minimum difference in price represented by the first configuration parameter, determining a third price within the representation of the price/volume curve based on a determination that a difference between a first volume associated with the third price and a second volume associated with a fourth price adjacent to the third price does not exceed the maximum difference in volume represented by the second configuration parameter, and determining a fifth price within the representation of the price/volume curve based on a determination that a difference between a third volume associated with the fifth price and a fourth volume associated with a sixth price adjacent to the fifth price meets the minimum difference in volume represented by the third configuration parameter; and
   outputting the representation of the price/volume curve, comprising the first price, the third price and the fifth price, to the campaign control system to enable the campaign control system to determine an initial bid calculated, utilizing the representation of the price/volume curve, to achieve a desired pacing.

2. The computer-implemented method of claim 1, comprising:
   defining at least one configuration parameter of the plurality of configuration parameters based on user input.

3. The computer-implemented method of claim 1, comprising:
   dynamically learning at least one configuration parameter of the plurality of configuration parameters.

4. The computer-implemented method of claim 1, comprising:
   dynamically learning, via machine learning algorithms, at least one configuration parameter of the plurality of configuration parameters.

5. The computer-implemented method of claim 1, wherein at least one configuration parameter of the plurality of configuration parameters is pre-defined.

6. The computer-implemented method of claim 1, wherein at least one configuration parameter of the plurality of configuration parameters is programmatically defined.

7. The computer-implemented method of claim 1, wherein the event is an impression, click, conversion, or a view.

8. The computer-implemented method of claim 1, wherein the representation of the price/volume curve is a vector.

9. One or more computer-readable storage media having instructions embodied thereon which, when executed by one or more processors, cause the one or more processors to:
- receive a request for price/volume information, the request including an identifier of a target audience;
- determine a plurality of prices associated with one or more volumes based on previously collected price/volume data of an event for the target audience;
- responsive to the request for price/volume relationship information, generate a vector representation of a price/volume curve based on the plurality of prices associated with the one or more volumes, wherein the generating comprises at least one of determining a first price within the vector representation of the price/volume curve based on a determination that a difference between the first price and a second price adjacent to the first price meets a minimum difference in price represented by a first configuration parameter, determining a third price within the vector representation of the price/volume curve based on a determination that a difference between a first volume associated with the third price and a second volume associated with a fourth price adjacent to the third price does not exceed a maximum difference in volume represented by a second configuration parameter, or determining a fifth price within the vector representation of the price/volume curve based on a determination that a difference between a third volume associated with the fifth price and a fourth volume associated with a sixth price adjacent to the fifth price meets a minimum difference in volume represented by a third configuration parameter; and
- output the vector representation of the price/volume curve to a dashboard to aid a user of the dashboard in determining aspects of an online marketing campaign that includes the target audience.

10. The one or more computer-readable storage media of claim 9, wherein the instructions cause the one or more processors to:
- partition the previously collected price/volume data, wherein to generate the vector representation of the price/volume curve causes the one or more processors to:
  - create the vector representation of the price/volume curve from a price value and volume value for each partition that results from the partitioning.

11. The one or more computer-readable storage media of claim 9, wherein the instructions cause the one or more processors to:
- partition the previously collected price/volume data, wherein partitioning the previously collected price/volume data is based on a minimum desired price difference between adjacent prices.

12. The one or more computer-readable storage media of claim 9, wherein the instructions cause the one or more processors to:
- partition the previously collected price/volume data, wherein partitioning the previously collected price/volume data based on a volume difference of an event between adjacent partitions includes partitioning the previously collected price/volume data based on a maximum relative difference in volume between the adjacent partitions.

13. The one or more computer-readable storage media of claim 12, wherein the maximum relative difference in volume is represented as a maximum percentage change in volume between the adjacent partitions.

14. The one or more computer-readable storage media of claim 9, wherein the instructions cause the one or more processors to:
- partition the previously collected price/volume data, wherein partitioning the previously collected price/volume data based on a volume difference of an event between adjacent partitions includes partitioning the previously collected price/volume data based on a minimum desired difference in volume between the adjacent partitions.

15. A system, comprising:
- one or more processors; and
- memory, coupled with the one or more processors, having instructions stored thereon, which, when executed by the one or more processors cause the one or more processors to:
  - receive a request for price/volume information for a target event, the request including an identifier of a target audience;
  - partition previously collected price/volume data into a plurality of partitions based on a magnitude of difference in volume between adjacent partitions;
  - define a plurality of configuration parameters, wherein the plurality of configuration parameters comprises at least one of a first configuration parameter representative of a minimum difference in price between adjacent members of a vector representation of a price/volume curve, a second configuration parameter representative of a maximum difference in volume between adjacent members of the vector representation of the price/volume curve, or a third configuration parameter representative of a minimum difference in volume between adjacent members of the vector representation of the price/volume curve;
  - create the vector representation of the price/volume curve that includes a price value and volume value for each of the plurality of partitions based on the plurality of configuration parameters, wherein the creating comprises at least one of determining a first price within the vector representation of the price/volume curve based on a determination that a difference between the first price and a second price adjacent to the first price meets the minimum difference in price represented by the first configuration parameter, determining a third price within the vector representation of the price/volume curve based on a determination that a difference between a first volume associated with the third price and a second volume associated with a fourth price adjacent to the third price does not exceed the maximum difference in volume represented by the second configuration parameter, or determining a fifth price within the vector representation of the price/volume curve based on a determination that a difference between a third volume associated with the fifth price and a fourth volume associated with a sixth price adjacent to the fifth price meets the minimum difference in volume represented by the third configuration parameter; and
  - output the vector representation of the price/volume curve to one of:
    - a dashboard to aid a user of the dashboard in determining aspects of an online marketing campaign that includes the target audience; or
    - a campaign control system to enable the campaign control system to determine an initial bid calculated, utilizing the vector representation of the price/volume curve, to achieve a desired pacing.

16. The system of claim 15, wherein to partition the previously collected price/volume data into a plurality of partitions based on a magnitude of difference in volume between adjacent partitions is based on a minimum desired price difference between adjacent prices.

17. The system of claim 15, wherein the magnitude of difference in volume between adjacent partitions includes a maximum relative difference in volume between the adjacent partitions.

18. The system of claim 17, wherein the maximum relative difference in volume is represented as a maximum percentage change in volume between the adjacent partitions.

19. The system of claim 15, wherein the magnitude of difference in volume between adjacent partitions includes a minimum desired difference in volume between the adjacent partitions.

20. The system of claim 15, wherein to partition the previously collected price/volume data into a plurality of partitions is based on a maximum relative difference in volume between the adjacent partitions, a minimum desired difference in volume between the adjacent partitions, and a minimum desired price difference between the adjacent partitions.

* * * * *